United States Patent
Chen et al.

(10) Patent No.: US 7,714,932 B2
(45) Date of Patent: *May 11, 2010

(54) APPARATUS AND METHOD FOR ADAPTIVELY DE-INTERLACING IMAGE FRAME

(75) Inventors: Hao Chang Chen, Shindian (TW); Sheng-Che Tsao, Shindian (TW)

(73) Assignee: Via Technologies, Inc., Taipei (TW)

( * ) Notice: Subject to any disclaimer, the term of this patent is extended or adjusted under 35 U.S.C. 154(b) by 75 days.

This patent is subject to a terminal disclaimer.

(21) Appl. No.: 12/073,682

(22) Filed: Mar. 7, 2008

(65) Prior Publication Data

US 2008/0158418 A1 Jul. 3, 2008

Related U.S. Application Data

(63) Continuation of application No. 11/091,507, filed on Mar. 29, 2005, now Pat. No. 7,365,795.

(30) Foreign Application Priority Data

Sep. 22, 2004 (TW) ............................... 93128779 A

(51) Int. Cl.
H04N 7/01 (2006.01)
H04N 11/20 (2006.01)
H04N 5/14 (2006.01)
H04N 9/64 (2006.01)

(52) U.S. Cl. .................... 348/452; 348/699; 375/240.16

(58) Field of Classification Search ............... 348/416.1, 348/441, 448, 451, 452, 458, 699, 700; 375/240.16
See application file for complete search history.

(56) References Cited

U.S. PATENT DOCUMENTS

| | | | | |
|---|---|---|---|---|
| 5,208,677 A | * | 5/1993 | Nishimura | .................. 386/74 |
| 5,469,226 A | | 11/1995 | David et al. | |
| 5,642,170 A | * | 6/1997 | Hackett et al. | ............... 348/459 |
| 5,781,249 A | * | 7/1998 | Hwang | ........................ 348/699 |
| 5,784,114 A | * | 7/1998 | Borer et al. | .................. 348/452 |
| 5,943,099 A | * | 8/1999 | Kim | ........................... 348/448 |
| 5,995,154 A | * | 11/1999 | Heimburger | ................. 348/448 |
| 6,141,056 A | * | 10/2000 | Westerman | .................. 348/448 |
| 6,160,586 A | * | 12/2000 | Justiss et al. | ................. 348/452 |
| 6,192,080 B1 | * | 2/2001 | Sun et al. | ............... 375/240.16 |
| 6,262,773 B1 | * | 7/2001 | Westerman | .................. 348/448 |
| 6,269,484 B1 | | 7/2001 | Simsic et al. | |

(Continued)

Primary Examiner—Brian P Yenke
(74) Attorney, Agent, or Firm—Birch, Stewart, Kolasch & Birch, LLP

(57) ABSTRACT

An apparatus for adaptive de-interlace of a frame comprises a line-segment difference-value calculating module, a motion-vector calculating module, an intra-block calculating module, a trigger-value producing module, and an image processing module. The line-segment difference-value calculating module computes a difference value of a line segment within the frame. The motion-vector calculating module computes a motion vector of a macro block that is located in the frame and comprises the line segment. The intra-block calculating module computes the amount of intra blocks in the frame. The trigger-value producing module determines whether the amount of the intra blocks is larger than a first threshold or not, so as to select an algorithm for generating a trigger value. The image processing module determines whether the trigger value is larger than a second threshold or not and then selects a de-interlace algorithm for de-interlacing the line segment.

19 Claims, 4 Drawing Sheets

U.S. PATENT DOCUMENTS

| | | | |
|---|---|---|---|
| 6,317,464 B1 | 11/2001 | Le et al. | |
| 6,389,168 B2* | 5/2002 | Altunbasak et al. | 382/224 |
| 6,459,455 B1* | 10/2002 | Jiang et al. | 348/452 |
| 6,509,930 B1 | 1/2003 | Hirano et al. | |
| 6,661,464 B1 | 12/2003 | Kokkosoulis et al. | |
| 6,751,405 B1 | 6/2004 | Hasegawa et al. | |
| 6,822,691 B1* | 11/2004 | Kim et al. | 348/452 |
| 6,900,846 B2 | 5/2005 | Lee et al. | |
| 7,006,157 B2 | 2/2006 | Sohn | |
| 7,042,512 B2 | 5/2006 | Yang et al. | |
| 7,050,108 B2 | 5/2006 | Nishibori et al. | |
| 7,057,665 B2 | 6/2006 | Jung et al. | |
| 7,116,372 B2 | 10/2006 | Kondo et al. | |
| 7,197,075 B2 | 3/2007 | Akimoto et al. | |
| 7,206,028 B2* | 4/2007 | Yeh et al. | 348/448 |
| 7,215,375 B2* | 5/2007 | Chen et al. | 348/448 |
| 7,277,132 B2 | 10/2007 | Chen et al. | |
| 7,289,157 B2 | 10/2007 | Briand et al. | |
| 7,342,962 B2* | 3/2008 | Fernandes | 375/240.02 |
| 7,349,029 B1* | 3/2008 | Chou | 348/448 |
| 7,375,763 B2* | 5/2008 | Alfonso et al. | 348/448 |
| 2002/0196362 A1* | 12/2002 | Yang et al. | 348/452 |
| 2004/0070686 A1* | 4/2004 | Jung et al. | 348/448 |
| 2004/0101058 A1* | 5/2004 | Sasai et al. | 375/240.26 |
| 2004/0189866 A1* | 9/2004 | Lin et al. | 348/452 |
| 2004/0190623 A1* | 9/2004 | Lunter | 375/240.16 |
| 2004/0208384 A1* | 10/2004 | Lin et al. | 382/254 |
| 2004/0257467 A1* | 12/2004 | Nicolas | 348/452 |
| 2005/0151879 A1* | 7/2005 | Chen et al. | 348/452 |
| 2005/0163219 A1* | 7/2005 | Chen et al. | 375/240.16 |
| 2005/0168656 A1* | 8/2005 | Wyman et al. | 348/700 |
| 2005/0196052 A1* | 9/2005 | Xin et al. | 382/233 |
| 2005/0219410 A1* | 10/2005 | Cheng et al. | 348/452 |
| 2006/0050971 A1* | 3/2006 | Page et al. | 382/232 |
| 2006/0069542 A1* | 3/2006 | Chen et al. | 703/22 |
| 2006/0152585 A1* | 7/2006 | Bourret et al. | 348/180 |
| 2006/0233236 A1* | 10/2006 | Labrozzi et al. | 375/240.03 |

* cited by examiner

FIG. 4

APPARATUS AND METHOD FOR ADAPTIVELY DE-INTERLACING IMAGE FRAME

CROSS REFERENCE TO RELATED APPLICATIONS

This application is a continuation of application Ser. No. 11/091,507, filed Mar. 29, 2005, now U.S. Pat. No. 7,365,795 which claims the priority under 35 U.S.C. §119(a) on Patent Application No(s). 093128779 filed in Taiwan, Republic of China on Sep. 22, 2004, the entirety thereof being incorporated herein by reference.

BACKGROUND OF THE INVENTION

1. Field of Invention

The invention relates to an apparatus and a method for de-interlacing a frame and, in particular, to an apparatus and a method for adaptive de-interlace of a frame.

2. Related Art

According to the well-developed technology, the displaying quality of video media is greatly progressed. However, different image processing methods may affect the displaying quality while displaying the video media. The different processing methods are, for example, the interlace scan method and the progressive scan method.

An interlace scan frame is composed of two fields, wherein each field includes only the odd scan lines of the frame or the even scan lines of the frame. In the interlace scan frame, the resolution of each odd field and/or even field is only half of the original frame. The advantage of the interlace scan method is to smoothly display the dynamic image, and the disadvantage thereof is to cause the blurring in the displayed image. The scan speed of the progressive scan is twice of the interlace scan, so that the progressive scan can present fine and clear frames. As a result, the present advanced video apparatus adopts the progressive scan method for scanning and displaying.

Regarding to the scan standard of present analog televisions, the most popular standards includes the Television Standards Committee (NTSC) system and Phase Alternation by Line (PAL) system. The NTSC system adopts the interlace scan method, so that if the image of the NTSC system is displayed in a progressive scan display system, the displayed frame only includes the odd field or the even field resulting in the poor image resolution (only half of the original image resolution). Therefore, the display quality of the image is unsatisfied. In addition, if an interlace scan DVD image is directly displayed on a progressive scan display system, the above-mentioned problem also occurs. To solve the above-mentioned problem, the interlace scan image must be de-interlaced. In other words, the de-interlace process is a way for transforming the interlace scan image into the progressive scan image.

The de-interlace processes include two typical linear transform technologies, which are weave and bob de-interlace processes. Referring to FIG. 1A, the weave de-interlace process is to overlaid or weave two input fields (including an odd field and an even field) for generating a progressive frame. As shown in FIG. 1B, the bob de-interlace process is to accept only one input field, such as the even frame only, and to discard the other field, such as the odd frame. Thus, the resolution of the vertical direction of the frame is decreased to half of the original image. To recover the resolution of the image, two adjacent scan lines of the same field are used to compensate the scan line there between in the discarded field.

The weave de-interlace process has better effects for static images, but may have misalignment for the dynamic images, which results in the serrations at the edge of the frame and decreases the displaying qualities. The bob de-interlace process may overcome the misalignment problem to obtain clear and nature dynamic images. However, for the static images, the bob de-interlace process decreases the vertical resolution of the images and then compensates it by the interpolation method. Thus, the displayed frame becomes blurred and is not sharp.

It is therefore a subjective of the invention to provide an apparatus and a method for adaptive de-interlace of a frame, which can select the proper de-interlace algorithm according to the interlace scan frame to be processed, so as to employ the suitable de-interlace method to process the dynamic or static image. Thus, the displaying qualities can be enhanced.

SUMMARY OF THE INVENTION

In view of the foregoing, the invention is to provide an apparatus and a method for adaptive de-interlace of a frame.

To achieve the above, an apparatus for adaptive de-interlace a frame of the invention includes a line-segment difference-value calculating module, a motion-vector calculating module, an intra-block calculating module, a trigger-value producing module, and an image processing module. In the invention, the line-segment difference-value calculating module computes a difference value of a line segment within the frame. The motion-vector calculating module computes a motion vector of a macro block that is located in the frame and comprises the line segment. The intra-block calculating module computes the amount of intra blocks in the frame. The trigger-value producing module determines whether the amount of the intra blocks is larger than a first threshold or not. If so, the trigger-value producing module then generates a trigger value according to the difference value of the line segment; otherwise, if not, the trigger-value producing module then generates the trigger value according to the difference value of the line segment and the motion vector. The image processing module determines whether the trigger value is larger than a second threshold or not. If so, the image processing module de-interlaces the line segment according to a first de-interlace algorithm; otherwise, if not, the image processing module de-interlaces the line segment according to a second de-interlace algorithm.

In addition, the invention also discloses a method for adaptive de-interlace of a frame, comprising the following steps of: calculating a difference value of a line segment within the frame; calculating a motion vector of a macro block, which is located in the frame and comprises the line segment; calculating the amount of intra blocks in the frame; determining whether the amount of the intra blocks is larger than a first threshold or not; if the amount of the intra blocks is larger than the first threshold, generating a trigger value according to the difference value of the line segment; if the amount of the intra blocks is no larger than the first threshold, generating the trigger value according to the difference value of the line segment and the motion vector; determining whether the trigger value is larger than a second threshold or not; if the trigger value is larger than the second threshold, de-interlacing the line segment according to a first de-interlace algorithm; and if the trigger value is no larger than the second threshold, de-interlacing the line segment according to a second de-interlace algorithm.

As mentioned above, the apparatus for adaptive de-interlace of the frame has a trigger-value producing module and an image processing module, which can select the proper de-interlace algorithm, such as the bob or weave de-interlace algorithm, according to the difference value of the line segment, the motion vector and the amount of intra blocks. Therefore, the frame obtained according to the apparatus and method of the invention may have better display effects.

BRIEF DESCRIPTION OF THE DRAWINGS

The invention will become more fully understood from the detailed description given herein below illustration only, and thus is not limitative of the present invention, and wherein:

FIG. 4 is a schematic view showing output values of pixels in different fields of a present frame and a reference frame for illustrating the method for adaptive de-interlace a frame according to the embodiment of the invention.

DETAILED DESCRIPTION OF THE INVENTION

The present invention will be apparent from the following detailed description, which proceeds with reference to the accompanying drawings, wherein the same references relate to the same elements.

Figure 1A:
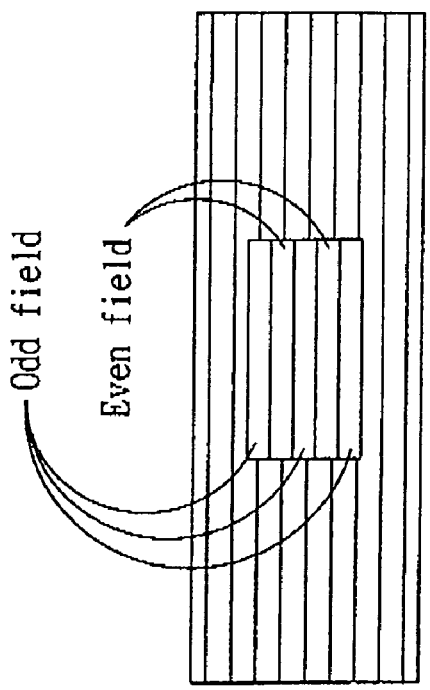
FIG. 1A is a schematic view showing the frame according to the weave de-interlace method.
Figure 1B:
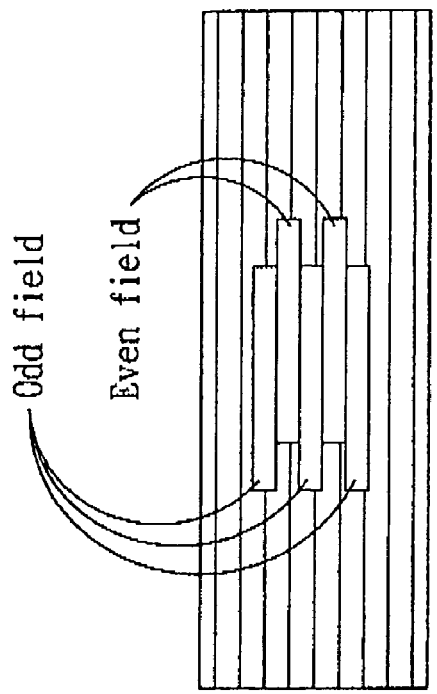
FIG. 1B is a schematic view showing the frame according to the bob de-interlace method.
Figure 2:
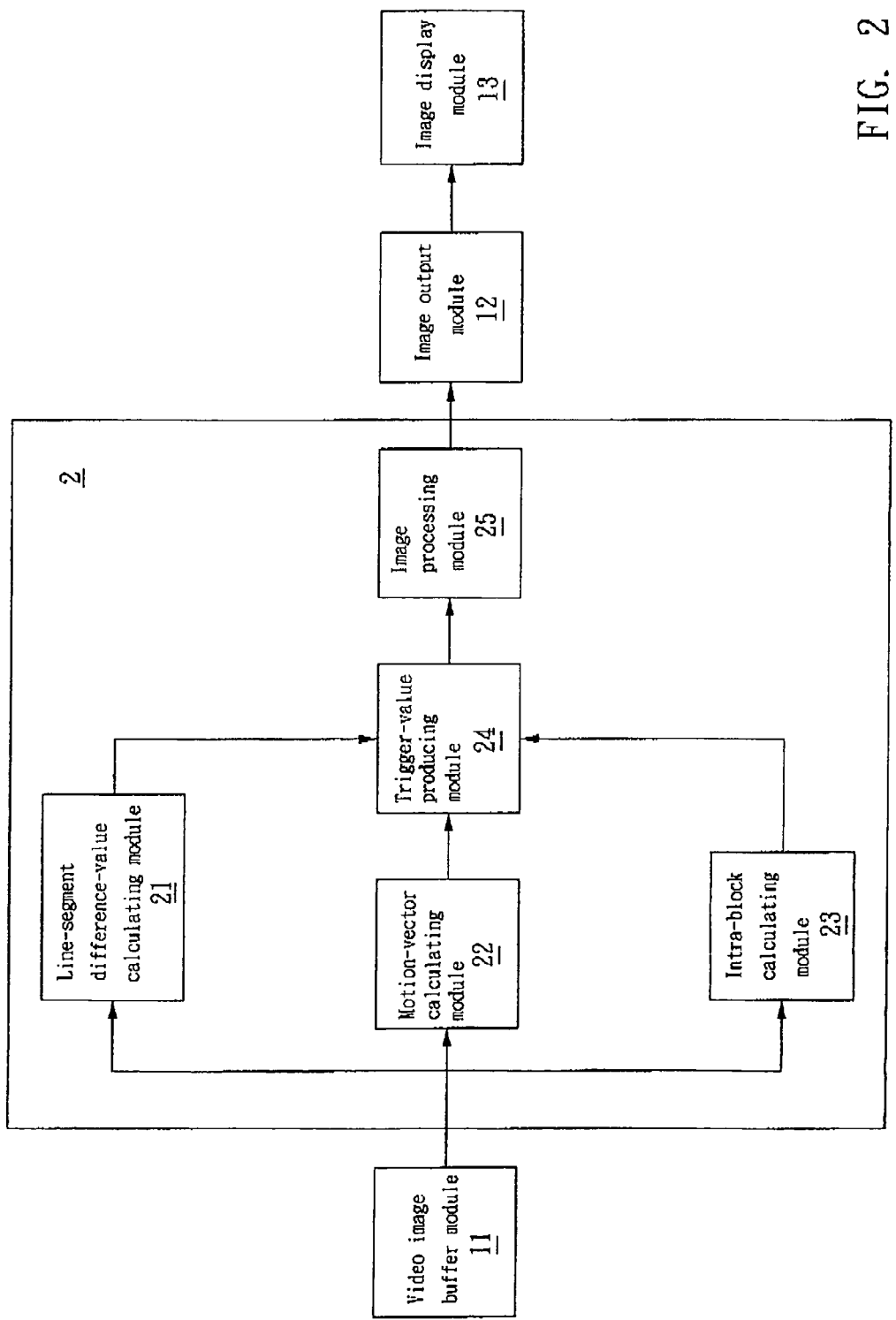
FIG. 2 is a schematic view showing an apparatus for adaptive de-interlace of a frame according to a preferred embodiment of the invention.

With reference to FIG. 2, an apparatus 2 for adaptive de-interlace of a frame according to an embodiment of the invention includes a line-segment difference-value calculating module 21, a motion-vector calculating module 22, an intra-block calculating module 23, a trigger-value producing module 24, and an image processing module 25. Moreover, the apparatus 2 may include a video image buffer module 11 and an image output module 12, which are respectively for providing frames and outputting the de-interlaced image. The apparatus 2 may further include an image display module 13 for receiving and displaying the de-interlaced image outputted from the image output module 12. Of course, other equivalent modifications and changes familiar to those skilled in the art should be included in the scope of the invention. For example, the apparatus for adaptive de-interlace of the frame may include/exclude the image display module.

The line-segment difference-value calculating module 21 computes a difference value of a line segment within the frame. The motion-vector calculating module 22 computes a motion vector of a macro block that is located in the frame and comprises the line segment. The intra-block calculating module 23 computes the amount of intra blocks in the frame. The trigger-value producing module 24 determines whether the amount of the intra blocks is larger than a first threshold or not. If the amount of the intra blocks is larger than a first threshold, the trigger-value producing module 24 then generates a trigger value according to the difference value of the line segment; otherwise, if the amount of the intra blocks is no larger than a first threshold, the trigger-value producing module 24 then generates a trigger value according to the difference value of the line segment and the motion vector. The image processing module 25 determines whether the trigger value is larger than a second threshold or not. If the trigger value is larger than a second threshold, the image processing module 25 de-interlaces the line segment according to a first de-interlace algorithm; otherwise, if the trigger value is no larger than a second threshold, the image processing module 25 de-interlaces the line segment according to a second de-interlace algorithm. Wherein, the first de-interlace algorithm is a bob de-interlace algorithm, and the second de-interlace algorithm is a weave de-interlace algorithm.

Figure 3:
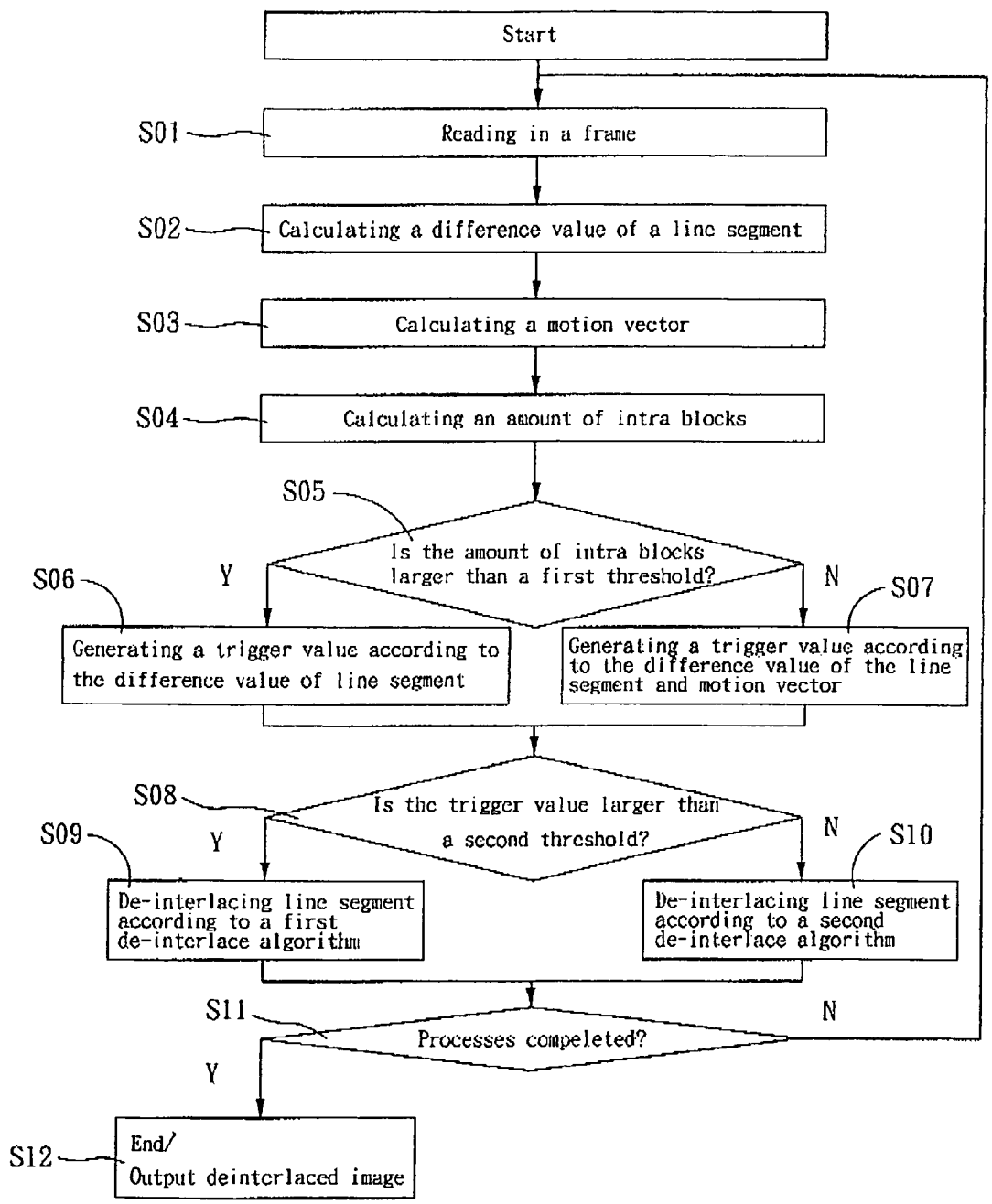
FIG. 3 is a flow chart showing a method for adaptive de-interlace of a frame according to a preferred embodiment of the invention.

A method for adaptive de-interlace of a frame according an embodiment of the invention will be described hereinafter with reference to FIGS. 3 and 4. To be noted, this method could be applied cooperating with the above-mentioned apparatus 2, so the following descriptions will include the same modules and corresponding reference numbers as previously illustrated.

The method for adaptive de-interlace of a frame according to an embodiment of the invention includes the following steps S01 to S12. In the step S01, a frame is read in from the video image buffer module 11. The frame can be a decoded MPEG decompressed image or comprise predicted frame (P frame) information including motion vectors.

After the line-segment difference-value calculating module receives the pixel data of the macro blocks in the reference frame and the present frame, the step S02 is to choose a line-segment width. Accordingly, in the scope of the micro block, each scan line can be divided into several line segments of the same width. Then, the difference value of the line segment can be obtained according to the comparison between characteristic values of two line segments, which are located at the same position of different frames.

The characteristic value ($\delta_{i,n,m}$) of the line segment can be determined according to the sum of the absolute value of the difference between the output values of pixels at the relative positions of adjacent two scan lines in two fields, and can be calculated according to the following equation (1):

$$\delta_{i,n,m} = Dif(i:n:m) = \sum_{k=1}^{j} \left| \text{Odd}(n)\_\text{LineSeg}(m)\_\text{Pix}(k) - \text{Even}(n+1)\_\text{LineSeg}(m)\_\text{Pix}(k) \right| \quad (1)$$

Wherein, i shows the present frame, n shows the number of the scan line in the frame, m shows the number of the line segment in the scan line, j shows the (adjustable) width of the line segment (unit: pixel), and k shows the position of the pixel in the line segment.

After computing the characteristic value ($\delta_{i,n,m}$) of the line segment in the present frame and the characteristic value ($\delta_{i-1,n,m}$) of the line segment in the reference frame, the absolute value of the difference there between is then calculated to obtain the difference value of the line segment, which can be calculated according to the following equation (2):

$$\Delta_{i,n,m} = |(\delta_{i,n,m}) - (\delta_{i-1,n,m})| \quad (2)$$

Figure 4:
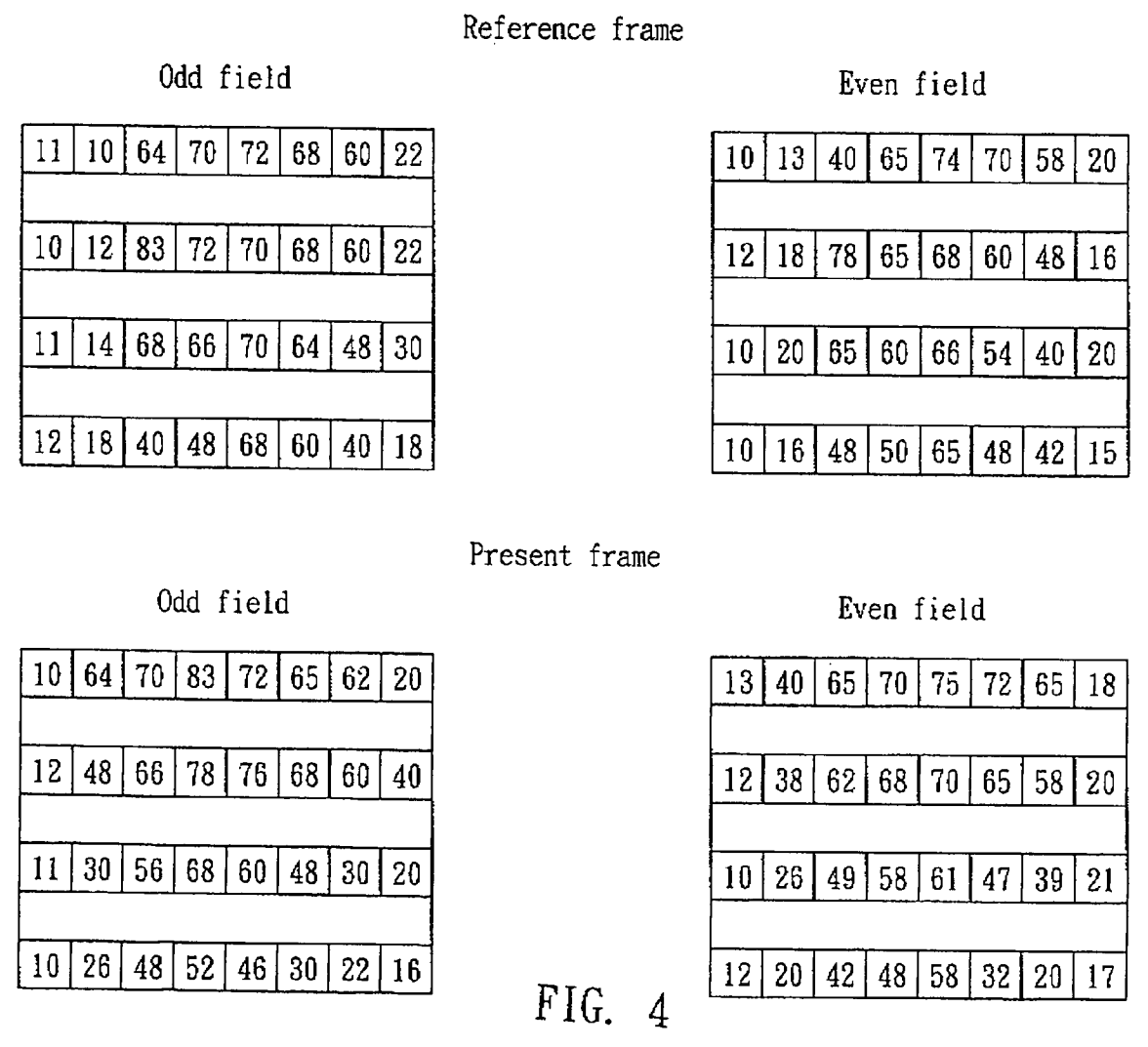

The FIG. 4 shows output values of pixels in different fields of the present frame and reference frame. Assuming the width of each line segment includes 4 pixels, the four output values of the pixels of a first line segment in the odd field of the present frame should be (10, 64, 70, 83). The four output values of the pixels of a first line segment in the even field of the present frame should be (13, 40, 65, 70). According to the equation (1), the characteristic value of the first line segment in the present frame is 45 as shown in the following equation (3). In addition, the four output values of the pixels of a first line segment in the odd field of the reference frame should be (11, 10, 64, 70), and the four output values of the pixels of a first line segment in the even field of the reference frame should be (10, 13, 40, 65). According to the equation (1), the characteristic value of the first line segment in the reference frame is 33 as shown in the following equation (4). After obtaining the characteristic values, the difference value of the line segment can be computed according to the equation (2) and is 12 as shown in the following equation (5).

$$\delta_{i,n,m}=\Sigma(|10-13|+|64-40|+|70-65|+|83-70|)=45 \quad (3)$$

$$\delta_{i-1,n,m}=\Sigma(|11-10|+|10-13|+|64-40|+|70-65|)=33 \quad (4)$$

$$\Delta_{i,n,m}=|(\delta_{i,n,m})-(\delta_{i-1,n,m})|=|45-33|=12 \quad (5)$$

After the step S02 for computing the difference value of the line segment, the step S03 is then to use the motion-vector calculating module to retrieve the motion vector of the macro block, in which the processed line segment is located. Hence the motion vector presents the displacement between different fields of a certain block in the same time, it can be shown as a specific coordinate values. If the motion vectors of all blocks are read in one by one, the desired frame can be built. To be noted, the dimension of a block is usually composed of 8×8 pixels or 16×16 pixels, and, of course, it can be composed of other compositions of pixels. This can be adjusted according to the performance of the apparatus for performing the de-interlace process and the capacity of memory.

After retrieving the motion vector, the motion-vector calculating module computes the sum of a length of the X component of the motion vector and a length of the Y component of the motion vector, which is a right-angle length of the motion vector. For example, assuming the retrieved motion vector is (1,−32), that means the block has a positive displacement of 1 pixel in X-coordinate and a negative displacement of 32 pixels in Y-coordinate. Thus, the right-angle length of the motion vector is 33 as shown in the following equation (6):

$$|1|+|-32|=33 \quad (6)$$

In the step S04, the intra-block calculating module computes the amount of macro blocks marked as intra blocks within an entire frame. If one macro block is marked as an intra block, this marked macro block has no displacement. Thus, the image of this marked macro block (intra block) is not generated according to the motion vector and the reference block, but should be constructed according to the pixel information of the macro block directly. In other words, the more macro blocks are marked as the intra blocks in the frame, the less relationship is between the frame and the reference frame.

In the step S05, the trigger-value producing module then determines whether the amount of the intra blocks (calculated in the step S04) is larger than a first threshold or not. If so, the step S06 is consequently performed to generate a trigger value according to the difference value of the line segment. If not, the step S07 is consequently performed to generate the trigger value according to the difference value of the line segment and the motion vector.

In step S08, the image processing module determines whether the trigger value (produced in the step S06 or S07) is larger than a second threshold or not. If so, the step S09 is then performed to de-interlace the line segment of the present frame according to a first de-interlace algorithm, which is a bob de-interlace algorithm. If not, the step S10 is consequently performed to de-interlace the line segment of the present frame according to a second de-interlace algorithm, which is a weave de-interlace algorithm.

After that, the step S11 is to determine whether the entire frame has been processed or not. If any line segment and image are not processed yet, then the steps S02 to S10 are repeated again. Otherwise, if all line segment and image are already processed, the step S12 is then performed.

In the step S12, the de-interlace process is complete and ended, and the de-interlaced image can then be outputted to the image output module to construct an output image. Various kinds of display apparatuses can then display the output image.

To sum up, the apparatus for adaptive de-interlace of the frame has a trigger-value producing module and an image processing module, which can select the proper de-interlace algorithm, such as the bob or weave de-interlace algorithm, according to the difference value of the line segment, the motion vector and the amount of intra blocks. Therefore, the frame obtained according to the apparatus and method of the invention may have better display effects.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method for adaptive de-interlace of a frame, comprising:
    calculating an amount of intra blocks in the frame;
    determining a trigger value according to the amount of intra blocks in the frame;
    determining whether the trigger value is larger than a threshold or not;
    de-interlacing a line-segment within the frame according to a first de-interlace algorithm in response to the trigger value is larger than the threshold; and
    de-interlacing the line-segment within the frame according to a second de-interlace algorithm in response to the trigger value is smaller than the threshold.

2. The method of claim 1, wherein the trigger value is generated according to a difference value of the line segment in response to the amount of the intra blocks is larger than an amount threshold.

3. The method of claim 2, wherein the trigger value is generated according to the difference value of the line segment and a motion vector of a macro blocking comprising the line segment, in response to the amount of the intra blocks is smaller than an amount threshold.

4. The method of claim 3, wherein the motion vector comprises a right-angle length of the motion vector, which is according to at least one of the followings:
    a length of the X component of the motion vector; and
    a length of the Y component of the motion vector.

5. The method of claim 3, wherein the frame comprises at least one of the followings:
    a Motion Picture Expert Group (MPEG) decompressed image; and
    predicted frame information, further comprising the motion vector.

6. The method of claim 2, wherein the difference value of the line segment is the difference between a characteristic value of a line segment in a present frame and a characteristic value of a line segment in a reference frame.

7. The method of claim 1, further comprising:
    outputting an output image consisting of the de-interlaced line segment.

8. A method for adaptive de-interlace of a frame, comprising:
    calculating an amount of intra blocks in the frame;

determining whether the amount of intra blocks is larger than an amount threshold;
generating a trigger value according to a difference value of a line segment within the frame if the amount of the intra blocks is larger than the amount threshold;
determining whether the trigger value is larger than a threshold or not;
de-interlacing the line-segment according to a first de-interlace algorithm in response to the trigger value is larger than the threshold; and
de-interlacing the line-segment according to a second de-interlace algorithm in response to the trigger value is smaller than the threshold.

9. The method of claim 8, further comprising:
calculating a first characteristic value of the line segment in a present frame according to the sum of the absolute value of the difference between the output values of pixels at the relative positions of adjacent two scan lines in two fields;
calculating a second characteristic value of the line segment in a reference frame; and
obtaining the difference value of the line segment by calculating the absolute value of the difference of the first characteristic value and the second characteristic value.

10. A method for adaptive de-interlace of a frame, comprising:
generating a trigger value according to a difference value of a line segment within the frame and a motion vector of a macro blocking comprising the line segment;
determining whether the trigger value is larger than a threshold or not;
de-interlacing the line-segment according to a first de-interlace algorithm in response to the trigger value is larger than the threshold; and
de-interlacing the line-segment according to a second de-interlace algorithm in response to the trigger value is smaller than the threshold,
wherein the motion vector comprises a right-angle length of the motion vector, and the right-angle length is the sum of a length of the X component of the motion vector and a length of the Y component of the motion vector.

11. The method of claim 10, wherein the trigger value is generated in response to an amount of intra blocks in the frame is smaller than an amount threshold.

12. An apparatus for adaptive de-interlace of a frame, comprising:
an intra-block calculating module, which computes an amount of intra blocks in the frame;
a trigger value producing module, which generates a trigger value according to the amount of intra blocks in the frame; and
an image processing module, which determines whether the trigger value is larger than a threshold or not, wherein if so, the image processing module de-interlaces a line-segment within the frame according to a first de-interlace algorithm, and if not, the image processing module de-interlaces the line-segment within the frame according to a second de-interlace algorithm.

13. The apparatus of claim 12, further comprising:
a line-segment difference value calculating module, which computes a difference value of the line segment within the frame, wherein the trigger value is generated, by the trigger value producing module, according to the difference value of the line segment in response to the amount of the intra blocks is larger than an amount threshold.

14. The apparatus of claim 13, further comprising:
a motion vector calculating module, which computes a motion vector of a macro block in the frame comprising the line segment, wherein the trigger value is generated, by the trigger value producing module, according to the difference value of the line segment and the motion vector of a macro blocking comprising the line segment, in response to the amount of the intra blocks is smaller than an amount threshold.

15. The apparatus of claim 14, wherein the motion vector comprises a right-angle length of the motion vector, which is according to one of the followings:
a length of the X component of the motion vector; and
a length of the Y component of the motion vector.

16. The apparatus of claim 13, wherein the difference value of the line segment is the difference between a characteristic value of a line segment in a present frame and a characteristic value of a line segment in a reference frame.

17. An apparatus for adaptive de-interlace of a frame, comprising:
a line-segment difference value calculating module, which computes a difference value of a line segment within the frame;
an intra-block calculating module, which computes an amount of intra blocks in the frame;
a trigger value producing module, which determines whether the amount of the intra blocks is larger than an amount threshold, wherein if so, the trigger-value producing module generates a trigger value according to the difference value; and
an image processing module, which determines whether the trigger value is larger than a threshold or not, wherein if so, the image processing module de-interlaces the line-segment within the frame according to a first de-interlace algorithm, and if not, the image processing module de-interlaces the line-segment within the frame according to a second de-interlace algorithm.

18. An apparatus for adaptive de-interlace of a frame, comprising:
a line-segment difference value calculating module, which computes a difference value of a line segment within the frame;
a motion vector calculating module, which computes a motion vector of a macro block in the frame comprising the line segment by computing the sum of a length of the X component of the motion vector and a length of the Y component of the motion vector, which is a right-angle length of the motion vector;
a trigger value producing module, which generates a trigger value according to the difference value and the motion vector; and
an image processing module, which determines whether the trigger value is larger than a threshold or not, wherein if so, the image processing module de-interlaces the line-segment within the frame according to a first de-interlace algorithm, and if not, the image processing module de-interlaces the line-segment within the frame according to a second de-interlace algorithm.

19. The apparatus of claim 18, wherein the trigger value is generated in response to an amount of intra blocks in the frame is smaller than an amount threshold.

* * * * *